C. BARLOW.
CHEESE-TURNER.

No. 171,758. Patented Jan. 4, 1876.

WITNESSES:
Chas. Nida
A. F. Terry

INVENTOR:
C. Barlow
BY
ATTORNEYS.

UNITED STATES PATENT OFFICE.

CHARLES BARLOW, OF COOKSHIRE, CANADA.

IMPROVEMENT IN CHEESE-TURNERS.

Specification forming part of Letters Patent No. 171,758, dated January 4, 1876; application filed June 26, 1875.

*To all whom it may concern:*

Figure 1:
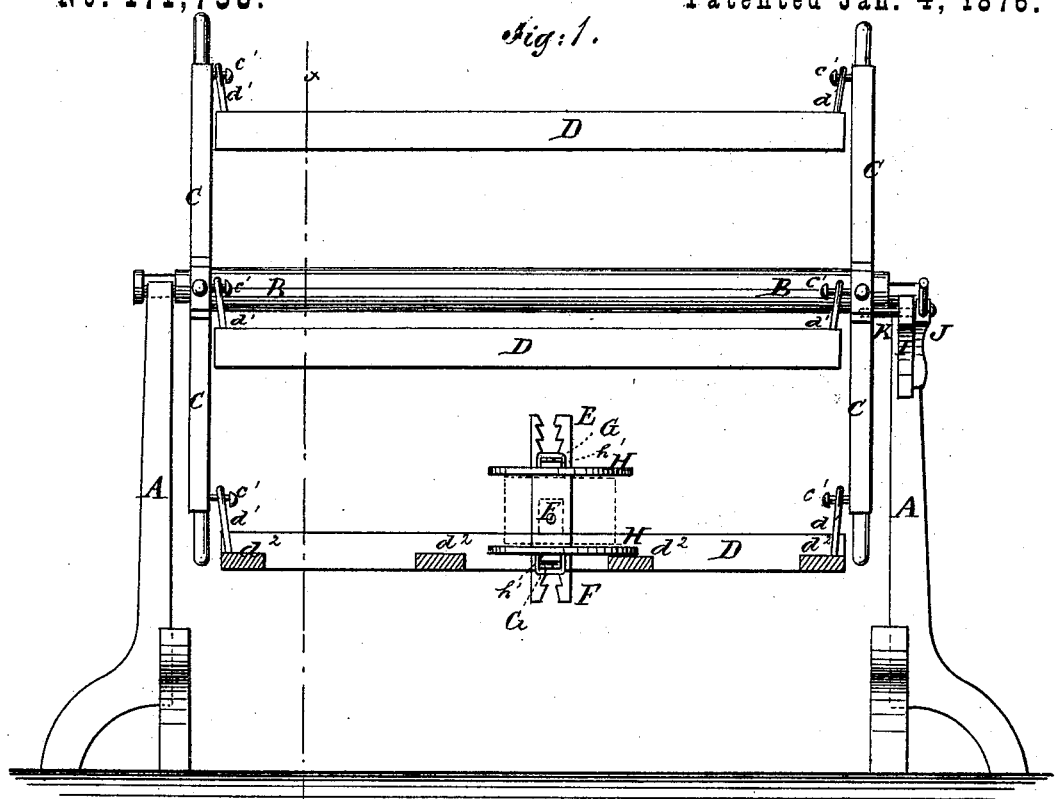
Figure 2:
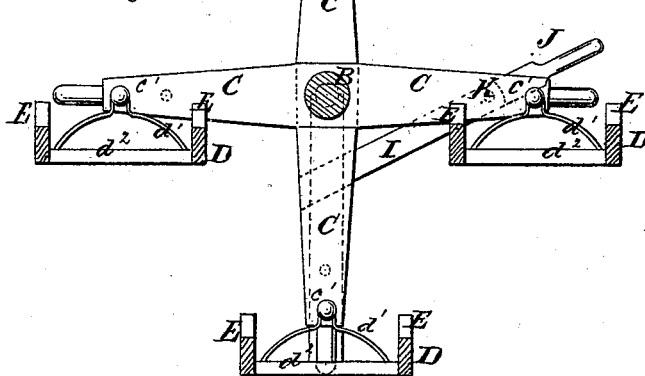

Be it known that I, CHARLES BARLOW, of Cookshire, Compton county, Province of Quebec, in the Dominion of Canada, have invented a new and useful Improvement in Cheese-Turners, of which the following is a specification:

Figure 1 is a front view of my improved apparatus, one of the swinging shelves being shown in section. Fig. 2 is a vertical cross-section of the same, taken through the line $x\ x$ of Fig. 1.

The object of this invention is to furnish an improved apparatus for holding cheeses, and enabling them to be conveniently turned and greased, and which shall be simple in construction and convenient in use, and will effect a great saving of time and labor.

The invention consists in the combination of the disks, the blocks, the springs, the perforated and the toothed pivoted bars, and the studs with the suspended shelves or frames and the reel and posts.

A are the two posts or standards, the lower end of each of which is provided with three or more legs to give it a stable support. In the upper ends of the posts A are formed half-round notches to receive the journals of shaft B. To the shaft B, near each end, are attached four or more radial arms, C, the corresponding arms of the two sets being parallel with each other. To the inner side of the arms C, near their outer ends, are attached knobs C′, to receive the bails or loops $d^1$, attached to the ends of the shelves or frames D. Each of the frames or shelves D consists of two side bars, connected by one more cross-bar, $d^2$, than the shelf is designed to receive cheeses, and which are designed to serve as stops to hold the cheeses steady while being greased.

The shelves D may be made of such a length as to receive twenty cheeses, or any other desired number.

To the side bars of the frames or shelves D, in the middle of the spaces between the cross-bars $d^2$, are rigidly attached short studs E, to the inner sides of each pair of which are pivoted two bars, F, at or near their center. In the arms of one of the bars F, at different distances from their centers, are formed a number of holes to receive the ends of the springs G, which are attached at their centers to the centers of blocks $h'$, attached to the disks H. The outer sides of the blocks $h'$ are rounded off toward each end. In the arms of the other bar, F, of each pair are formed longitudinal slots, in one or both the edges of which are formed ratchet-teeth to receive the other ends of the springs G, and thus clamp the cheese between the disks H. The blocks $h'$ are attached to the disks H at one side of the center, so that the outer part of the lower disk H may rest upon one of the stop-bars $d^2$, and thus hold the cheese steady while being greased.

This construction allows the cheeses to be turned and greased without removing them from the shelves D.

To the upper part of one of the posts A is rigidly attached an arm, I, to the outer side of which is attached one end of a spring, J. To the outer end of the spring J is attached a pin, K, which passes through a hole in the arm I, and enters a hole in one of the arms C, to hold the apparatus stationary while the cheeses are being greased.

This construction allows each shelf to be readily brought into such a position that the cheeses upon it may be conveniently reached.

Having thus described my invention, I claim as new and desire to secure by Letters Patent—

The combination of the disks H, the blocks $h'$, the springs G, the perforated and the toothed pivoted bars F, and the studs E with the suspended shelves or frames D $d^1\ d^2$, and the reel B C and posts A, substantially as herein shown and described.

CHARLES BARLOW.

Witnesses:
E. PELLEW FELTON,
W. F. WILLIS.